US010344181B2

(12) United States Patent
Steinmetz et al.

(10) Patent No.: US 10,344,181 B2
(45) Date of Patent: *Jul. 9, 2019

(54) AQUEOUS COATING COMPOSITION AND PRODUCTION OF MULTICOAT PAINT SYSTEMS USING SAID COATING COMPOSITION

(71) Applicant: BASF Coatings GmbH, Muenster (DE)

(72) Inventors: Bernhard Steinmetz, Ruetschenhausen (DE); Peggy Jankowski, Guentersleben (DE); Nadia Luhmann, Karlstadt-Stetten (DE); Michael Matura, Kitzingen (DE); Hardy Reuter, Muenster (DE); Peter Hoffmann, Senden (DE)

(73) Assignee: BASF Coatings GmbH, Muenster (DE)

( * ) Notice: Subject to any disclaimer, the term of this patent is extended or adjusted under 35 U.S.C. 154(b) by 151 days.

This patent is subject to a terminal disclaimer.

(21) Appl. No.: 15/104,912

(22) PCT Filed: Nov. 18, 2014

(86) PCT No.: PCT/EP2014/074929
§ 371 (c)(1),
(2) Date: Jun. 15, 2016

(87) PCT Pub. No.: WO2015/090807
PCT Pub. Date: Jun. 25, 2015

(65) Prior Publication Data
US 2016/0319155 A1 Nov. 3, 2016

(30) Foreign Application Priority Data
Dec. 18, 2013 (EP) .................... 13197935

(51) Int. Cl.
C09D 175/14 (2006.01)
C08G 18/67 (2006.01)
C08G 18/08 (2006.01)
C09D 175/16 (2006.01)
C08G 18/42 (2006.01)
C08F 290/14 (2006.01)
C09D 151/08 (2006.01)
B05D 7/00 (2006.01)
C08G 18/75 (2006.01)

(52) U.S. Cl.
CPC ............ C09D 175/14 (2013.01); B05D 7/50 (2013.01); C08F 290/147 (2013.01); C08G 18/0823 (2013.01); C08G 18/4233 (2013.01); C08G 18/67 (2013.01); C08G 18/675 (2013.01); C08G 18/755 (2013.01); C09D 151/08 (2013.01); C09D 175/16 (2013.01)

(58) Field of Classification Search
CPC ............ B05D 7/532; B05D 2451/00; B05D 2451/20; B05D 2451/40
See application file for complete search history.

(56) References Cited

U.S. PATENT DOCUMENTS 5,334,420 A * 9/1994 Hartung et al. ....... B05D 7/532
427/407.1
2013/0197152 A1 8/2013 Herve et al.

FOREIGN PATENT DOCUMENTS

| DE | 1 198 348 | 6/1961 |
|---|---|---|
| DE | 1 768 313 | 4/1968 |
| DE | 40 09 858 A1 | 10/1991 |
| DE | 44 37 535 A1 | 4/1996 |
| DE | 199 30 665 A1 | 1/2001 |
| DE | 199 48 004 A1 | 7/2001 |
| DE | 100 43 405 C1 | 6/2002 |
| DE | 199 48 004 B4 | 5/2006 |
| EP | 0 228 003 A1 | 7/1987 |
| EP | 0 634 431 A1 | 1/1995 |
| EP | 1 534 792 A1 | 6/2005 |
| RU | 2 254 351 C2 | 6/2005 |
| WO | 91/13918 | 9/1991 |
| WO | 91/15528 A1 | 10/1991 |
| WO | 92/15405 A1 | 9/1992 |
| WO | 02/46321 A2 | 6/2002 |
| WO | WO03/106010 A1 * | 12/2003 |

OTHER PUBLICATIONS

Athawale et al., Preparation and properties of urethane/acrylate composite by emulsion polymerization technique, Progress in Organic Coatings, vol. 65, Issue 3, Jul. 2009, pp. 392-400 (Year: 2009).*

(Continued)

Primary Examiner — Francisco W Tschen
(74) Attorney, Agent, or Firm — Oblon, McClelland, Maier & Neustadt, L.L.P.

(57) ABSTRACT

The present invention relates to an aqueous coating composition comprising at least one aqueous dispersion comprising at least one copolymer (CP), said copolymer (CP) being preparable by (i) initially charging an aqueous dispersion of at least one polyurethane, and then (ii) polymerizing a mixture of olefinically unsaturated monomers in the presence of the polyurethane from (i), in which (a) a water-soluble initiator is used, (b) the olefinically unsaturated monomers are metered in such that a concentration of 6.0% by weight, based on the total amount of olefinically unsaturated monomers used for polymerization, in the reaction solution is not exceeded over the entire reaction time, and (c) the mixture of the olefinically unsaturated monomers comprises at least one polyolefinically unsaturated monomer and at least one linear hydroxy-functional reaction product (R) having an acid number less than 20 mg KOH/g, the preparation of which involves using at least one compound (v) containing two functional groups (v.a) and an aliphatic or araliphatic hydrocarbyl radical (v.b) which is arranged between the functional groups and has 12 to 70 carbon atoms. The present invention also relates to a method for producing a multicoat paint system using the coating composition, and to the multicoat coating thus produced.

19 Claims, No Drawings

(56) References Cited

OTHER PUBLICATIONS

International Search Report dated Jan. 22, 2015 for PCT/EP2014/074929 filed on Nov. 18, 2014.

* cited by examiner

AQUEOUS COATING COMPOSITION AND PRODUCTION OF MULTICOAT PAINT SYSTEMS USING SAID COATING COMPOSITION

The present invention relates to an aqueous coating composition comprising a copolymer and a hydroxy-functional reaction product. The present invention also relates to a method for producing multicoat paint systems using the aqueous coating composition, and also to the multicoat paint systems producible by means of said method. In addition, the present invention relates to the use of the aqueous coating composition for improving the impact resistance of multicoat paint systems.

PRIOR ART

A multiplicity of methods are known for producing multicoat color and/or effect paint systems. The prior art discloses (cf., for example, German patent application DE 199 48 004 A1, page 17 line 37 to page 19 line 22, or German patent DE 100 43 405 C1, column 3 paragraph [0018], and column 8 paragraph [0052] to column 9 paragraph [0057], in conjunction with column 6 paragraph [0039] to column 8 paragraph [0050]), for example, the following method in which:

(1) a pigmented aqueous basecoat material is applied to a substrate,
(2) a polymer film is formed from the coating material applied in stage (1),
(3) a clearcoat material is applied to the resulting basecoat film, and then
(4) the basecoat film is cured together with the clearcoat film.

This method is widely employed, for example, for the OEM finishing of automobiles, and also for the painting of metal and plastic ancillary components. The methods described can be used to produce different multicoat paint systems which are able to achieve different performance properties, but are still in need of improvement in some aspects. A recurrent problem with multicoat paint systems in the automotive industry is that the impact resistance, which is very important for automobiles in particular, is not always achieved. Impact resistance refers to the mechanical resistance of coatings to rapid deformation. Of particularly high relevance in this context is stone-chip resistance, meaning the resistance of a paint system to stones which hit the surface of the paint system at high speed. This is because automotive paint systems in use are exposed particularly to this stone-chipping to a very intense degree.

Particular performance properties of multicoat paint systems can be influenced, for example, through the controlled matching and combination of specific components, such as binders or additives, in the coating compositions used for production of the paint systems.

Problem and Technical Solution

The problem addressed by the present invention was thus that of improving the impact resistance, especially stone-chip resistance, of multicoat paint systems. By improving the stone-chip resistance, it was to be possible, more particularly, to satisfy the ever-growing demands from the automobile manufacturers on the performance properties of multicoat paint systems.

It has been found that the stated problems have been solved by an aqueous coating composition comprising at least one aqueous dispersion comprising at least one copolymer (CP), said copolymer (CP) being preparable by
  (i) initially charging an aqueous dispersion of at least one polyurethane, and then
  (ii) polymerizing a mixture of olefinically unsaturated monomers in the presence of the polyurethane from (i), in which
    (a) a water-soluble initiator is used,
    (b) the olefinically unsaturated monomers are metered in such that a concentration of 6.0% by weight, based on the total amount of olefinically unsaturated monomers used for polymerization, in the reaction solution is not exceeded over the entire reaction time, and
    (c) the mixture of the olefinically unsaturated monomers comprises at least one polyolefinically unsaturated monomer, and at least one linear hydroxy-functional reaction product (R) having an acid number less than 20 mg KOH/g, the preparation of which involves using at least one compound (v) containing two functional groups (v.a) and an aliphatic or araliphatic hydrocarbyl radical (v.b) which is arranged between the functional groups and has 12 to 70 carbon atoms.

The novel aqueous coating composition is also referred to hereinafter as coating composition of the invention. Preferred embodiments of the coating composition of the invention are apparent from the description which follows and from the dependent claims.

The present invention also provides a method for producing multicoat paint systems using the aqueous coating composition, and to the multicoat paint systems producible by means of said method. In addition, the present invention relates to the use of the aqueous coating composition for improving the impact resistance of multicoat paint systems.

It has been found that the use of the coating composition of the invention for production of paint systems, especially multicoat paint systems, can distinctly improve the impact resistance of these paint systems. The use of the aqueous coating composition as a basecoat material especially achieves excellent stone-chip resistance to pinholes in the resulting multicoat paint system.

DETAILED DESCRIPTION

The Coating Composition of the Invention

The coating composition of the invention comprises a specific aqueous dispersion comprising at least one specific copolymer (CP), preferably exactly one copolymer (CP).

A copolymer in the context of the present invention refers to polymers formed from different polymer types, for example a polyurethane and a (meth)acrylate polymer. This explicitly includes both polymers covalently bonded to one another and those in which the various polymers are bonded to one another by adhesion. Combinations of both kinds of bonding are also covered by this definition. The term "(meth)acrylate" covers acrylates, methacrylates and mixtures thereof.

The copolymer (CP) is preparable by
  (i) initially charging an aqueous dispersion of at least one polyurethane, and then
  (ii) polymerizing a mixture of olefinically unsaturated monomers in the presence of the polyurethane from (i), in which a. a water-soluble initiator is used, b. the olefinically unsaturated monomers are metered in such that a concentration of 6.0% by weight, based on the total amount of olefinically unsaturated monomers used for polymerization, in the reaction solution is not exceeded over the entire reaction time, and c. the mixture of the olefinically unsaturated monomers comprises at least one polyolefinically unsaturated monomer.

In the first preparation step, an aqueous dispersion of a polyurethane resin is initially charged.

Suitable saturated or unsaturated polyurethane resins are described, for example, in German patent application DE 199 48 004 A1, page 4 line 19 to page 11 line 29 (polyurethane prepolymer B1), European patent application EP 0 228 003 A1, page 3 line 24 to page 5 line 40, European patent application EP 0 634 431 A1, page 3 line 38 to page 8 line 9, or international patent application WO 92/15405, page 2 line 35 to page 10 line 32.

The polyurethane resin is prepared using firstly, preferably, the aliphatic, cycloaliphatic, aliphatic-cycloaliphatic, aromatic, aliphatic-aromatic and/or cycloaliphatic-aromatic polyisocyanates known to those skilled in the art. Particular preference is given to aliphatic and aliphatic-cycloaliphatic polyurethane resins.

The alcohol components used for the preparation of the polyurethane resins are preferably the saturated and unsaturated polyols known to those skilled in the art, and optionally, in minor amounts, also monoalcohols. More particularly, diols and, optionally in minor amounts, triols are used to introduce branches. Examples of suitable polyols are saturated or olefinically unsaturated polyester polyols and/or polyether polyols. More particularly, the polyols used are polyester polyols, especially those having a number-average molecular weight of 400 to 5000 g/mol. Unless specifically indicated otherwise, the number-average molecular weight in the context of the present invention is determined by means of vapor pressure osmosis. Measurement was effected using a vapor pressure osmometer (model 10.00 from Knauer) on concentration series of the component under investigation in toluene at 50° C., with benzophenone as calibration substance for determination of the experimental calibration constant of the instrument employed (in accordance with E. Schröder, G. Müller, K.-F. Amdt, "Leitfaden der Polymercharakterisierung" [Introduction to polymer characterization], Akademie-Verlag, Berlin, pp. 47-54, 1982, in which benzil was used as calibration substance).

The polyurethane initially charged in aqueous dispersion is preferably a hydrophilically stabilized polyurethane. For hydrophilic stabilization and/or to increase dispersibility in aqueous medium, the polyurethane resin preferably present may contain particular ionic groups and/or groups which can be converted to ionic groups (potentially ionic groups). Polyurethane resins of this kind are referred to in the context of the present invention as ionically hydrophilically stabilized polyurethane resins. Likewise present may be nonionic hydrophilically modifying groups. Preferred, however, are the ionically hydrophilically stabilized polyurethanes. In more precise terms, the modifying groups are alternatively functional groups which can be converted to cations by neutralizing agents and/or quaternizing agents, and/or cationic groups (cationic modification)

or functional groups which can be converted to anions by neutralizing agents, and/or anionic groups (anionic modification)

or nonionic hydrophilic groups (nonionic modification)

or combinations of the aforementioned groups.

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted to cationic groups by neutralizing agents and/or quaternizing agents). Mention should also be made of the cationic groups—groups prepared from the aforementioned functional groups using neutralizing agents and/or quaternizing agents known to those skilled in the art—such as primary, secondary, tertiary and/or quaternary ammonium groups, tertiary sulfonium groups and/or quaternary phosphonium groups, more particularly quaternary ammonium groups and tertiary sulfonium groups.

As is well known, the functional groups for anionic modification are, for example, carboxylic acid, sulfonic acid and/or phosphonic acid groups, more particularly carboxylic acid groups (functional groups which can be converted to anionic groups by neutralizing agents), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane resin through monomers which contain the ionic or potentially ionic groups. The nonionic modifications are introduced, for example, through the incorporation of poly(ethylene) oxide polymers as lateral or terminal groups in the polyurethane molecules. The hydrophilic modifications are introduced, for example, via compounds which contain at least one group reactive toward isocyanate groups, preferably at least one hydroxyl group. The ionic modification can be introduced using monomers which, as well as the modifying groups, contain at least one hydroxyl group. To introduce the nonionic modifications, preference is given to using the polyether diols and/or alkoxypoly(oxyalkylene) alcohols known to those skilled in the art.

Preference is given to adding at least one organic solvent to the initially charged polyurethane dispersion, said organic solvent preferably being miscible in any ratio with water and in any ratio with the mixture of olefinically unsaturated monomers. Suitable organic solvents are N-methylpyrrolidone, N-ethylpyrrolidone and ether alcohols, such as methoxypropanol in particular, though it should be noted that pyrrolidone-based solvents may be dispensed with for environmental reasons alone. However, the amount of the organic solvent is selected such that the aqueous character of the dispersion is conserved.

In the second preparation step, a polymerization of a mixture of olefinically unsaturated monomers in the presence of the polyurethane is conducted by the methods of what is called free-radical emulsion polymerization in the presence of at least one polymerization initiator.

The polymerization initiator used has to be a water-soluble initiator. Examples of suitable initiators are potassium peroxodisulfate, sodium peroxodisulfate or ammonium peroxodisulfate, and also hydrogen peroxide, tert-butyl hydroperoxide, 2,2'-azobis(2-amidoisopropane) dihydrochloride, 2,2'-azobis(N,N'-dimethyleneisobutyramidine) dihydrochloride or 2,2'-azobis(4-cyano)pentanoic acid. The initiators are used either alone or in a mixture, for example mixtures of hydrogen peroxide and sodium persulfate. The known redox initiator systems can also be used as polymerization initiators. Such redox initiator systems comprise at least one peroxide-containing compound in combination with a redox coinitiator, for example reducing sulfur compounds, for example bisulfites, sulfites, thiosulfates, dithionites or tetrathionates of alkali metals and ammonium compounds, sodium hydroxymethanesulfinate dihydrate and/or thiourea. For instance, it is possible to use combinations of peroxodisulfates with alkali metal or ammonium hydrogensulfites, for example ammonium peroxodisulfate and ammonium disulfite. The weight ratio of peroxide-containing compounds to the redox coinitiators is preferably 50:1 to 0.05:1. In combination with the initiators or the redox initiator systems, it is additionally possible to use transition metal catalysts, for example iron salts, nickel salts, cobalt salts, manganese salts, copper salts, vanadium salts or chromium salts, such as iron(II) sulfate, cobalt(II) chloride, nickel(II) sulfate, copper(I) chloride, manganese(II) acetate, vanadium(III) acetate, manganese(II) chloride. Based on the monomers, these transition metal salts are typically used in amounts of 0.1 to 1000 ppm. For instance, it is possible to use combinations of hydrogen peroxide with iron(II) salts, for example 0.5 to 30% hydrogen peroxide and 0.1 to 500 ppm of Mohr's salt.

The initiators are preferably used in an amount of 0.05 to 20% by weight, preferably 0.05 to 10%, more preferably of 0.1 to 5% by weight, based on the total weight of the olefinically unsaturated monomers used for polymerization. The terms "total amount" and "total weight" are equivalent.

The result of the use of the water-soluble initiator is that olefinically unsaturated monomers which are added to the aqueous dispersion initially charged can react immediately to give oligomers. These oligomers have a lesser tendency to penetrate into the polyurethane particles of the dispersion initially charged than the smaller monomers.

The polymerization is appropriately conducted, for example, at a temperature of greater than 0 to 160° C., preferably 60 to 95° C.

Preference is given to working under exclusion of oxygen, preferably in a nitrogen stream. In general, the polymerization is performed at standard pressure, but it is also possible to employ lower pressures or higher pressures, especially when polymerization temperatures above the boiling point of the monomers and/or of the organic solvents are employed.

The copolymers (CP) for use in accordance with the invention are prepared by free-radical aqueous emulsion polymerization, in which case surfactants or protective colloids can be added to the reaction medium. A list of suitable emulsifiers and protective colloids is given, for example, in Houben Weyl, Methoden der organischen Chemie [Methods of Organic Chemistry], volume XIV/1 Makromolekulare Stoffe [Macromolecular Substances], Georg Thieme Verlag, Stuttgart 1961, p. 411 ff.

An important factor for the preparation of the aqueous dispersions for use in accordance with the invention, comprising the copolymer (CP), is the control of the conditions of the polymerization reaction of the mixture of olefinically unsaturated monomers in the presence of the polyurethane. This is conducted in the manner of what is called a "starve feed", "starve fed" or "starved feed" polymerization.

A starved feed polymerization in the context of the present invention is considered to be an emulsion polymerization in which the content of residual monomers in the reaction solution is minimized during the reaction time, meaning that the metered addition of the olefinically unsaturated monomers is effected in such a way that a concentration of 6.0% by weight, preferably 5.0% by weight, more preferably 4.0% by weight, particularly advantageously 3.5% by weight, based in each case on the total amount of olefinically unsaturated monomers used for polymerization, in the reaction solution is not exceeded over the entire reaction time. In this context, further preference is given to concentration ranges of the olefinically unsaturated monomers of 0.01 to 6.0% by weight, preferably 0.02 to 5.0% by weight, more preferably 0.03 to 4.0% by weight, especially 0.05 to 3.5% by weight, based in each case on the total amount of olefinically unsaturated monomers used for polymerization. For example, the highest proportion (or concentration) detectable during the reaction may be 0.5% by weight, 1.0% by weight, 1.5% by weight, 2.0% by weight, 2.5% by weight or 3.0% by weight, while all further values detected are then below the values specified here. The term "concentration" in this context is thus obviously equivalent to the term "proportion".

The concentration of the monomers in the reaction solution, referred to hereinafter as free monomers, can be controlled in various ways.

One way of minimizing the concentration of the free monomers is to select a very low metering rate for the mixture of olefinically unsaturated monomers. When the rate of metered addition is so low that all monomers can react very quickly as soon as they are in the reaction solution, it is possible to ensure that the concentration of the free monomers is minimized.

As well as the metering rate, it is important that sufficient free radicals are always present in the reaction solution, so that the monomers metered in can each be reacted very rapidly. For this purpose, reaction conditions should preferably be selected such that the initiator feed is already commenced prior to commencement of the metered addition of the olefinically unsaturated monomers. Preferably, the metered addition is commenced at least 5 minutes beforehand, more preferably at least 10 minutes beforehand. Preferably at least 10% by weight of the initiator, more preferably at least 20% by weight, most preferably at least 30% by weight of the initiator, based in each case on the total amount of initiator, are added prior to commencement of the metered addition of the olefinically unsaturated monomers.

The amount of initiator is an important factor for the sufficient presence of free radicals in the reaction solution. The amount of initiator should be selected such that sufficient free radicals are available at any time, so that the monomers metered in can react. If the amount of initiator is increased, it is also possible to react greater amounts of monomers at the same time.

A further factor which can determine the reaction rate is the structure of the monomers, i.e. particularly the structural properties thereof and the reactivity which derives therefrom.

The concentration of the free monomers can thus be controlled through the interplay of the amount of initiator, rate of initiator addition, rate of monomer addition, and through the choice of monomers. Both the slowing of the metered addition and the increase in the amount of initiator, and also the early commencement of the addition of the initiator, serve the particular aim of keeping the concentration of the free monomers below the abovementioned limits.

The concentration of the monomers in the reaction solution can be determined by gas chromatography at any juncture in the reaction. Typical parameters for the gas chromatography determination are as follows: 50 m silica capillary column with polyethylene glycol phase or 50 m silica capillary column with polydimethylsiloxane phase, helium carrier gas, split injector 150° C., oven temperature 40 to 220° C., flame ionization detector, detector temperature 275° C., internal standard: isobutyl acrylate. In the context of the present invention, the concentration of the monomers is preferably determined by gas chromatography, especially while observing the abovementioned parameters.

Should this analysis determine a concentration of free monomers close to the limit for the starved feed polymerization, for example because of a high proportion of olefinically unsaturated monomers having a low reactivity, the abovementioned parameters can be utilized to control the reaction. In this case, for example, the metering rate of the monomers can be reduced and/or the amount of initiator can be increased.

Suitable olefinically unsaturated monomers may be mono- or polyolefinically unsaturated. Preferably, at least one monoolefinically unsaturated and at least one polyolefinically unsaturated monomer are present.

Examples of suitable monoolefinically unsaturated monomers include vinylic monoolefinically unsaturated monomers, such as especially (meth)acrylate-based monoolefinically unsaturated monomers and allyl compounds. Examples are also alpha,beta-unsaturated carboxylic acids. Preference is given to using at least, but not necessarily exclusively, (meth)acrylate-based monoolefinically unsaturated monomers.

The (meth)acrylate-based, monoolefinically unsaturated monomers may, for example, be (meth)acrylic acid and esters, nitriles or amides of (meth)acrylic acid. Preference is given to esters of (meth)acrylic acid having a non-olefinically unsaturated R radical.

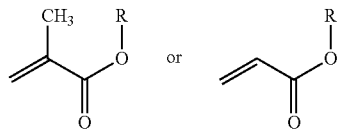

The R radical may be aliphatic or aromatic. The R radical is preferably aliphatic. The R radical may, for example, be an alkyl radical, or contain heteroatoms. Examples of R radicals containing heteroatoms are ethers. Preference is given to using at least, but not necessarily exclusively, monomers in which the R radical is an alkyl radical.

If R is an alkyl radical, it may, for example, be a linear, branched or cyclic alkyl radical. In all three cases, it may comprise unsubstituted alkyl radicals or alkyl radicals substituted by functional groups. The alkyl radical has preferably 1 to 20, more preferably 1 to 10, carbon atoms.

Particularly preferred monunsaturated esters of (meth) acrylic acid having an unsubstituted alkyl radical are methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth)acrylate, hexyl (meth)acrylate, ethylhexyl (meth)acrylate, 3,3,5-trimethylhexyl (meth)acrylate, stearyl (meth)acrylate, lauryl (meth)acrylate, cycloalkyl (meth)acrylates such as cyclopentyl (meth)acrylate, isobornyl (meth)acrylate and cyclohexyl (meth)acrylate, very particular preference being given to n- and tert-butyl (meth)acrylate and methyl methacrylate.

Suitable monounsaturated esters of (meth)acrylic acid having a substituted alkyl radical may preferably be substituted by one or more hydroxyl groups.

Particularly preferred monounsaturated esters of (meth) acrylic acid having an alkyl radical substituted by one or more hydroxyl groups are 2-hydroxyethyl (meth)acrylate, 2-hydroxypropyl (meth)acrylate, 3-hydroxypropyl (meth) acrylate, 3-hydroxybutyl (meth)acrylate and 4-hydroxybutyl (meth)acrylate.

Possible further vinylic monounsaturated monomers are monomers having a non-olefinically unsaturated R' radical on the vinyl group.

The R' radical may be aliphatic or aromatic, preference being given to aromatic radicals.

The R' radical may be a hydrocarbyl radical, or contain heteroatoms. Examples of R' radicals containing heteroatoms are ethers, esters, amide, nitriles and heterocycles. Preferably, the R' radical is a hydrocarbyl radical. If R' is a hydrocarbyl radical, it may be substituted or unsubstituted by heteroatoms, preference being given to unsubstituted radicals. Preferably, the R' radical is an aromatic hydrocarbyl radical.

Particularly preferred further vinylic olefinically unsaturated monomers are vinylaromatic hydrocarbons, especially vinyltoluene, alpha-methylstyrene and especially styrene.

Further preferred monomers containing heteroatoms are olefinically unsaturated monomers such as acrylonitrile, methacrylonitrile, acrylamide, methacrylamide, N-dimethylacrylamide, vinyl acetate, vinyl propionate, vinyl chloride, N-vinylpyrrolidone, N-vinylcaprolactam, N-vinylformamide, N-vinylimidazole and N-vinyl-2-methylimidazoline.

Examples of suitable polyolefinically unsaturated monomers include esters of (meth)acrylic acid having an olefinically unsaturated R" radical, and allyl ethers of polyhydric alcohols.

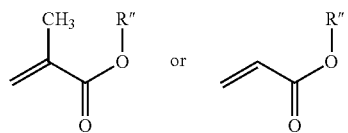

The R" radicals may, for example, be an allyl radical or a (meth)acrylic ester radical.

Preferred polyolefinically unsaturated monomers are ethylene glycol di(meth)acrylate, propylene 1,2-glycol di(meth)acrylate, propylene 2,2-glycol di(meth)acrylate, butane-1,4-diol di(meth)acrylate, neopentyl glycol di(meth) acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate and allyl (meth)acrylate.

Preferred polyolefinically unsaturated compounds are also acrylic and methacrylic esters of alcohols having more than two OH groups, for example trimethylolpropane tri (meth)acrylate or glyceryl tri(meth)acrylate, but also trimethylolpropane di(meth)acrylate monoallyl ether, trimethylolpropane (meth)acrylate diallyl ether, pentaerythrityl tri (meth)acrylate monoallyl ether, pentaerythrityl di(meth) acrylate diallyl ether, pentaerythrityl (meth)acrylate triallyl ether, triallylsucrose, and pentaallylsucrose.

Particular preference is given to using allyl methacrylate as the polyolefinically unsaturated monomer.

The mixture of the olefinically unsaturated monomers comprises at least one polyolefinically unsaturated monomer. Preferably, the mixture of the olefinically unsaturated monomers also comprises one or more monounsaturated esters of (meth)acrylic acid having an unsubstituted alkyl radical.

Preferably, the mixture of the olefinically unsaturated monomers contains 0.1 to 6.0 mol %, more preferably 0.1 to 2.0 mol %, most preferably 0.1 to 1.0 mol %, of polyolefinically unsaturated monomers. Preferably, the radical of the olefinically unsaturated monomers is monounsaturated.

Preferably, the mixture of the olefinically unsaturated monomers contains 0.1 to 6.0 mol %, more preferably 0.1 to 2.0 mol %, most preferably 0.1 to 2.0 mol %, of allyl methacrylate. More preferably, apart from allyl methacrylate, no further polyolefinically unsaturated monomers are present in the mixture.

Preferably, the mixture of olefinically unsaturated monomers contains less than 10.0% by weight, more preferably less than 5.0% by weight, of vinylaromatic hydrocarbons, based on the total amount of olefinically unsaturated monomers used in the polymerization. Most preferably, no vinylaromatic hydrocarbons are present in the mixture of the olefinically unsaturated monomers. It is especially preferable when less than 10.0% by weight, more preferably less than 5.0% by weight, based on the total amount of olefinically unsaturated monomers used in the polymerization, of olefinically unsaturated monomers having aromatic groups is used. More particularly, no olefinically unsaturated monomers having aromatic groups are present in the mixture of the olefinically unsaturated monomers.

It follows from this that the vinylaromatic hydrocarbons specified above as preferred, especially vinyltoluene, alpha-methylstyrene and styrene, are of course preferred only within the group of the monomers containing aromatic groups. In spite of this, these monomers are preferably not used in the context of the invention. Should the use of such monomers nevertheless be an option in the individual case, preference is given to using the monomers containing aromatic groups designated as preferred.

In a preferred embodiment, the mixture of olefinically unsaturated monomers comprises:
 98.0 to 99.5% by weight of one or more monounsaturated esters of (meth)acrylic acid having unsubstituted alkyl radicals, where the alkyl radicals preferably have 1 to 10 carbon atoms, and
 0.5 to 2.0% by weight of one or more polyunsaturated esters of (meth)acrylic acid,
based in each case on the total amount of olefinically unsaturated monomers used in the polymerization.

Preference is given to adding at least one solvent to the mixture of olefinically unsaturated monomers, said solvent preferably being miscible in any ratio with water and in any ratio with the mixture of olefinically unsaturated monomers. Suitable organic solvents are N-methylpyrrolidone, N-ethylpyrrolidone and ether alcohols, such as methoxypropanol in particular, though it should be noted that pyrrolidone-based solvents may be dispensed with for environmental reasons alone. However, the amount of the organic solvent is selected such that the aqueous character of the dispersion ultimately obtained is conserved.

By virtue of the preparation process described, the copolymers in the aqueous dispersion of the invention especially have a core-shell structure which can be achieved through the preparation process described. This core-shell structure is characterized by a core containing at least one polyurethane, and a shell containing at least one polymer which has been obtained by polymerization of olefinically unsaturated monomers.

The core-shell structure described is achieved through the specific reaction conditions of the starved feed polymerization. Over the entire reaction time, there are never any great amounts of olefinically unsaturated monomers, which could penetrate into the polyurethane particles, in the presence of the initially charged polyurethane. The free radicals provided by the water-soluble initiator, which are always present during the addition of monomer in the aqueous phase, form oligomers immediately on addition, which can no longer penetrate into the polyurethane. These then polymerize on the surface of the polyurethane.

In a preferred embodiment, the weight ratio of core to shell is 80:20 to 20:80, more preferably 60:40 to 40:60. What is meant here is the ratio of the amounts of components used for production of core (step (i), polyurethane) and shell (step (ii), mixture of olefinically unsaturated monomers).

Preferably, the copolymers (CP) in the aqueous dispersion have a particle size (z average) of 60 to 130 nm, more preferably of 70 to 115 nm, measured by means of photon correlation spectroscopy with a Malvem Nano S90 (from Malvem Instruments) at 25±1° C. The instrument, equipped with a 4 mW He—Ne laser at a wavelength of 633 nm, covers a size range from 1 to 3000 nm.

The copolymers (CP) may preferably be crosslinked. The gel content of the aqueous dispersion of the invention is preferably 40 to 97% by weight, more preferably 75 to 90% by weight, based in each case on the solids of the dispersion.

The gel content can be determined gravimetrically by freeze-drying the dispersion, determining the total mass of the freeze-dried polymer (corresponds to the solids of the dispersion in the context of determining the gel content), and then extracting the polymer in an excess of tetrahydrofuran (ratio of tetrahydrofuran to freeze-dried polymer=300:1) at 25° C. for 24 hours. The insoluble fraction is removed and dried in an air circulation oven at 50° C. for four hours. Thereafter, the dried, insoluble fraction is weighed and the quotient is formed with the total mass of the freeze-dried polymer. The value obtained corresponds to the gel content.

The weight-average molar mass of the copolymers (CP) is preferably $3*10^7$ g/mol to $8.5*10^9$ g/mol, it being possible to determine the weight-average molar mass by small-angle laser light scattering.

The acid number of the copolymers (CP) is preferably 0 to 220 mg KOH/g solid resin, preferably 0 to 40 mg KOH/g solid resin, more preferably 0 to 25 mg KOH/g solid resin. The OH number is preferably less than 70 mg KOH/g solid resin, preferably less than 20 mg KOH/g solid resin. The terms "solid resin" and "solids" in relation to a polymer or a dispersion of a polymer are equivalent. Thus, they refer more particularly to the solids or solid content of a polymer dispersion as elucidated below.

The acid number can be determined, for example, on the basis of DIN EN ISO 2114 in homogeneous solution of THF/water (9 parts by volume of THF and 1 part by volume of distilled water) with ethanolic potassium hydroxide solution.

The OH number can be determined on the basis of R.-P. Krüger, R. Gnauck and R. Algeier, Plaste und Kautschuk, 20, 274 (1982), by means of acetic anhydride in the presence of 4-dimethylaminopyridine as a catalyst in a tetrahydrofuran (THF)/dimethylformamide (DMF) solution at room temperature, by fully hydrolyzing the excess of acetic acid remaining after acetylation and conducting a potentiometric back-titration of the acetic acid with alcoholic potassium hydroxide solution.

The aqueous dispersions of the at least one copolymer (CP) preferably have a solids content of 15 to 45% by weight, especially preferably 25 to 35% by weight. Solids contents of this kind can be established without any problem through the use of appropriate amounts of organic solvents and especially water in the course of preparation of the copolymers and/or by appropriate dilution after the preparation.

The proportion of the copolymers (CP) is preferably in the range from 2.0 to 30% by weight, more preferably 2.5 to 20% by weight, especially preferably 3.0 to 15% by weight, especially 3.5 to 12% by weight, based in each case on the total weight of the coating composition of the invention.

The coating composition of the invention additionally comprises at least one specific reaction product (R), preferably exactly one reaction product (R).

The reaction products are linear. Linear reaction products can in principle be obtained by the conversion of difunctional reactants, in which case the linkage of the reactants via reaction of the functional groups gives rise to a linear, i.e. catenated, structure. Thus, for example, if the reaction product is a polymer, the backbone has a linear character. If the reaction product is, for example, a polyester, the reactants used may be diols and dicarboxylic acids, in which case the sequence of ester bonds in the reaction product has linear character. Preferably, in the preparation of the reaction product (R), principally difunctional reactants are thus used. Other reactants, such as monofunctional compounds in particular, are accordingly used preferably only in minor amounts, if at all. Especially at least 80 mol %, preferably at least 90 mol % and most preferably exclusively difunctional reactants are used. If further reactants are used, these are preferably selected exclusively from the group of the monofunctional reactants. It is preferable, however, that exclusively difunctional reactants are used.

Useful functional groups for the reactants include the functional groups known to the person skilled in the art in this context. The combinations of reactants having appropriate functional groups which can be linked to one another and can thus serve for preparation of the reaction product are also known in principle. The same applies to the reaction conditions necessary for linkage. Preferred functional groups for the reactants are hydroxyl, carboxyl, imino, carbamate, allophanate, thio, anhydride, epoxy, isocyanate, methylol, methylol ether, siloxane and/or amino groups, especially preferably hydroxyl and carboxyl groups. Preferred combinations of functional groups which can be linked to one another are hydroxyl and carboxyl groups, isocyanate and hydroxyl groups, isocyanate and amino groups, epoxy and carboxyl groups and/or epoxy and amino groups; in choosing the functional groups, it should be ensured that the hydroxyl functionality and acid number described below are obtained in the reaction product. The linkage then gives rise to the linkage points known to those skilled in the art, for example ester groups, urethane groups and/or urea groups. Very particular preference is given to a combination of hydroxyl and carboxyl groups. In this embodiment, at least one reactant thus has hydroxyl groups, and at least one further reactant carboxyl groups. Preference is given to using a combination of dihydroxy-functional and dicarboxy-functional reactants. Conducting the reaction of these reactants in a manner known per se forms reaction products containing ester bonds.

The reaction product is hydroxy-functional. It is preferable that the reactants are converted in such a way that linear molecules which form have two terminal hydroxyl groups. This means that one hydroxyl group is present at each of the two ends of these molecules.

The reaction product has an acid number of less than 20, preferably less than 15, especially preferably less than 10 and most preferably less than 5 mg KOH/g. Thus, it preferably has only a very small amount of carboxylic acid groups. Unless explicitly stated otherwise, the acid number in the context of the present invention is determined to DIN 53402. Thus, it relates to the reaction product per se, i.e. to the solids content (for determination of the solids content see below).

If reference is made in the context of the present invention to an official standard without reference to the official period of validity, this of course means the version of the standard current at the filing date or, if no current version exists at this date, the last current version.

The hydroxyl functionality described, just like the low acid number, can be obtained, for example, in a manner known per se by the use of appropriate ratios of reactants having appropriate functional groups. In the preferred case that dihydroxy-functional and dicarboxy-functional reactants are used in the preparation, an appropriate excess of the dihydroxy-functional component is thus used. In this context, the following should additionally be explained. For purely statistical reasons alone, a real reaction of course does not just give molecules having, for example, the desired (di)hydroxyl functionality. However, the choice of appropriate conditions, for example an excess of dihydroxy-functional reactants, and conducting the reaction until the desired acid number is obtained, guarantee that the conversion products or molecules which make up the reaction product are hydroxy-functional at least on average. The person skilled in the art knows how to choose appropriate conditions.

In the preparation of the reaction product, at least one compound (v) used or converted as a reactant has two functional groups (v.a) and an aliphatic or araliphatic hydrocarbyl radical (v.b) which is arranged between the two functional groups and has 12 to 70, preferably 22 to 55 and more preferably 30 to 40 carbon atoms. The compounds (v) thus consist of two functional groups and the hydrocarbyl radical. Useful functional groups of course include the above-described functional groups, especially hydroxyl and carboxyl groups. Aliphatic hydrocarbyl radicals are known to be acyclic or cyclic, saturated or unsaturated, nonaromatic hydrocarbyl radicals. Araliphatic hydrocarbyl radicals are those which contain both aliphatic and aromatic structural units.

The number-average molecular weight of the reaction products may vary widely and is, preferably, from 600 to 40 000 g/mol, especially from 800 to 10 000 g/mol, most preferably from 1200 to 5000 g/mol. Unless explicitly indicated otherwise, the number-average molecular weight in the context of the present invention is determined by means of vapor pressure osmosis. Measurement was effected using a vapor pressure osmometer (model 10.00 from Knauer) on concentration series of the component under investigation in toluene at 50° C., with benzophenone as calibration substance for determination of the experimental calibration constant of the instrument employed (in accordance with E. Schröder, G. Müller, K.-F. Arndt, "Leitfaden der Polymercharakterisierung", Akademie-Verlag, Berlin, pp. 47-54, 1982, in which benzil was used as calibration substance).

Preferred compounds (v) are dimer fatty acids, or are present in dimer fatty acids. In the preparation of the reaction products (R), dimer fatty acids are thus used preferably, but not necessarily exclusively, as compound (v). Dimer fatty acids (also long known as dimerized fatty acids or dimer acids) are generally, and especially in the context of the present invention, mixtures prepared by oligomerization of unsaturated fatty acids. They are preparable, for example, by catalytic dimerization of unsaturated plant fatty acids, the starting materials used more particularly being unsaturated $C_{12}$ to $C_{22}$ fatty acids. The bonds are formed principally by the Diels-Alder mechanism, and the result, depending on the number and position of the double bonds in the fatty acids used to prepare the dimer fatty acids, is mixtures of principally dimeric products having cycloaliphatic, linear aliphatic, branched aliphatic, and also $C_6$ aromatic hydrocarbon groups between the carboxyl groups. Depending on mechanism and/or any subsequent hydrogenation, the aliphatic radicals may be saturated or unsaturated, and the fraction of aromatic groups may also vary. The radicals between the carboxylic acid groups then contain, for example, 24 to 44 carbon atoms. For the preparation, fatty acids having 18 carbon atoms are used with preference, and so the dimeric product has 36 carbon atoms. The radicals which join the carboxyl groups of the dimer fatty acids preferably have no unsaturated bonds and no aromatic hydrocarbon radicals.

In the context of the present invention, $C_{18}$ fatty acids are thus used with preference in the preparation. Particular preference is given to the use of linolenic, linoleic and/or oleic acid.

Depending on the reaction regime, the above-identified oligomerization gives rise to mixtures comprising primarily dimeric molecules, but also trimeric molecules and monomeric molecules and other by-products. Purification is typically effected by distillation. Commercial dimer fatty acids generally contain at least 80% by weight of dimeric molecules, up to 19% by weight of trimeric molecules, and not more than 1% by weight of monomeric molecules and of other by-products.

Preference is given to using dimer fatty acids which consist to an extent of at least 90% by weight, preferably to an extent of at least 95% by weight, most preferably at least to an extent of 98% by weight, of dimeric fatty acid molecules.

In the context of the present invention, preference is given to using dimer fatty acids which consist of at least 90% by weight of dimeric molecules, less than 5% by weight of trimeric molecules, and less than 5% by weight of monomeric molecules and other by-products. Particular preference is given to the use of dimer fatty acids which consist of 95 to 98% by weight of dimeric molecules, less than 5% by weight of trimeric molecules, and less than 1% by weight of monomeric molecules and of other by-products. Likewise used with particular preference are dimer fatty acids consisting of at least 98% by weight of dimeric molecules, less than 1.5% by weight of trimeric molecules, and less than 0.5% by weight of monomeric molecules and other by-products. The fractions of monomeric, dimeric, and trimeric molecules and of other by-products in the dimer fatty acids can be determined, for example, by means of gas chromatography (GC). In that case, prior to the GC analysis, the dimer fatty acids are converted to the corresponding methyl esters via the boron trifluoride method (cf. DIN EN ISO 5509) and then analyzed by means of GC.

A fundamental identifier of "dimer fatty acids" in the context of the present invention, therefore, is that their preparation involves the oligomerization of unsaturated fatty acids. This oligomerization gives rise principally, in other words to an extent preferably of at least 80% by weight, more preferably to an extent of at least 90% by weight, even more preferably to an extent of at least 95% by weight and more particularly to an extent of at least 98% by weight, to dimeric products. The fact that the oligomerization thus gives rise to predominantly dimeric products containing exactly two fatty acid molecules justifies this designation, which is commonplace in any case. An alternative expression for the relevant term "dimer fatty acids", therefore, is "mixture comprising dimerized fatty acids". The use of dimeric fatty acids thus automatically implements the use of difunctional compounds (v). This also justifies the statement, chosen in the context of the present invention, that dimer fatty acids are preferably used as compound (v). This is because compounds (v) are apparently the main constituent of the mixtures referred to as dimer fatty acids. Thus, if dimer fatty acids are used as compounds (v), this means that these compounds (v) are used in the form of corresponding mixtures with above-described monomeric and/or trimeric molecules and/or other by-products.

The dimer fatty acids to be used can be obtained as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1061, and Empol 1062 from BASF, and Unidyme 10 and Unidyme TI from Arizona Chemical.

Further preferred compounds (v) are dimer diols, or are present in dimer diols. Dimer diols have long been known and are also referred to in the scientific literature as dimeric fatty alcohols. These are mixtures which are prepared, for example, by oligomerization of unsaturated fatty acids or esters thereof and subsequent hydrogenation of the acid or ester groups, or by oligomerization of unsaturated fatty alcohols. The starting materials used may be unsaturated $C_{12}$ to $C_{22}$ fatty acids or esters thereof, or unsaturated $C_{12}$ to $C_{22}$ fatty alcohols. The hydrocarbyl radicals which connect the hydroxyl groups in the dimer diols are defined in the same way as the hydrocarbyl radicals which divide the carboxyl groups of the dimer fatty acids.

For example, DE-11 98 348 describes the preparation thereof by dimerization of unsaturated fatty alcohols with basic alkaline earth metal compounds at more than 280° C.

They can also be prepared by hydrogenation of dimer fatty acids and/or esters thereof as described above, according to German Auslegeschrift DE-B-17 68 313. Under the conditions described therein, not only are the carboxyl groups of the fatty acids hydrogenated to hydroxyl groups, but any double bonds still present in the dimer fatty acids or esters thereof are also partly or fully hydrogenated. It is also possible to conduct the hydrogenation in such a way that the double bonds are fully conserved during the hydrogenation. In this case, unsaturated dimer diols are obtained. Preferably, the hydrogenation is conducted in such a way that the double bonds are very substantially hydrogenated.

Another way of preparing dimer diols involves dimerizing unsaturated alcohols in the presence of siliceous earth/ alumina catalysts and basic alkali metal compounds according to international application WO 91/13918.

Irrespective of the processes described for preparation of the dimer diols, preference is given to using those dimer diols which have been prepared from $C_{18}$ fatty acids or esters thereof, or $C_{18}$ fatty alcohols. In this way, predominantly dimer diols having 36 carbon atoms are formed.

Dimer diols which have been prepared by the abovementioned industrial processes always have varying amounts of trimer triols and monofunctional alcohols. In general, the proportion of dimeric molecules is more than 70% by weight, and the remainder is trimeric molecules and monomeric molecules. In the context of the invention, it is possible to use either these dimer diols or purer dimer diols having more than 90% by weight of dimeric molecules. Particular preference is given to dimer diols having more than 90 to 99% by weight of dimeric molecules, and preference is given in turn among these to those dimer diols whose double bonds and/or aromatic radicals have been at least partly or fully hydrogenated. An alternative expression for the relevant term "dimer diols" is thus "mixture comprising dimers preparable by dimerization of fatty alcohols". The use of dimer diols thus automatically implements the use of the functional compounds (v). This also justifies the statement, chosen in the context of the present invention, that dimer diols are used as compound (v). This is because compounds (v) are apparently the main constituent of the mixtures referred to as dimer diols. Thus, if dimer diols are used as compounds (v), this means that these compounds (v) are used in the form of corresponding mixtures with above-described monomeric and/or trimeric molecules and/or other by-products.

Preferably, the mean hydroxyl functionality of the dimer diols should be 1.8 to 2.2.

In the context of the present invention, particular preference is therefore given to using those dimer diols which can be prepared by hydrogenation from the above-described dimer fatty acids. Very particular preference is given to those dimer diols which consist of ≥90% by weight of dimeric molecules, ≤5% by weight of trimeric molecules, and ≤5% by weight of monomeric molecules and of other by-products, and/or have a hydroxyl functionality of 1.8 to 2.2. Particular preference is given to the use of those diols which can be prepared by hydrogenation from dimer fatty acids which consist of 95 to 98% by weight of dimeric molecules, less than 5% by weight of trimeric molecules, and less than 1% by weight of monomeric molecules and of other by-products. Particular preference is likewise given to the use of those diols which can be prepared by hydrogenation from dimer fatty acids which consist of ≥98% by weight of dimeric molecules, ≤1.5% by weight of trimeric molecules, and ≤0.5% by weight of monomeric molecules and of other by-products.

Dimer fatty acids which can be used to prepare the dimer diols contain, as already described above, according to the reaction regime, both aliphatic and possibly aromatic molecular fragments. The aliphatic molecular fragments can be divided further into linear and cyclic fragments, which in turn may be saturated or unsaturated. Through hydrogenation, the aromatic and the unsaturated aliphatic molecular fragments can be converted to corresponding saturated aliphatic molecular fragments. The dimer diols usable as component (v) may accordingly be saturated or unsaturated. The dimer diols are preferably aliphatic, especially aliphatic and saturated.

In the context of the present invention, preference is given to using those dimer diols which can be prepared by hydrogenation of the carboxylic acid groups of preferably saturated aliphatic dimer fatty acids.

Particular preference is given to the use of those diols which can be prepared by hydrogenation from dimer fatty acids which consist of ≥98% by weight of dimeric molecules, ≤1.5% by weight of trimeric molecules, and ≤0.5% by weight of monomeric molecules and of other by-products.

More preferably, the dimer diols have a hydroxyl number of 170 to 215 mg KOH/g, even more preferably of 195 to 212 mg KOH/g and especially 200 to 210 mg KOH/g, determined by means of DIN ISO 4629. More preferably, the dimer diols have a viscosity of 1500 to 5000 mPas, even more preferably 1800 to 2800 mPas (25° C., Brookfield, ISO 2555).

Dimer diols for use with very particular preference include the commercial products Pripol® 2030 and especially Priopol® 2033 from Uniqema, or Sovermol® 908 from BASF.

Preferred reaction products (R) are preparable by reaction of dimer fatty acids with aliphatic, araliphatic or aromatic dihydroxy-functional compounds. Aliphatic compounds are nonaromatic organic compounds. They may be linear, cyclic or branched. Possible examples of compounds are those which consist of two hydroxyl groups and an aliphatic hydrocarbyl radical. Also possible are compounds which, as well as the two oxygen atoms present in the two hydroxyl groups, contain further heteroatoms such as oxygen or nitrogen, especially oxygen, for example in the form of linking ether and/or ester bonds. Araliphatic compounds are those which contain both aliphatic and aromatic structural units. It is preferable, however, that the reaction products (R) are prepared by reaction of dimer fatty acids with aliphatic dihydroxy-functional compounds.

The aliphatic, araliphatic or aromatic dihydroxy-functional compounds preferably have a number-average molecular weight of 120 to 6000 g/mol, especially preferably of 200 to 4500 g/mol.

The statement of a number-average molecular weight thus implies that preferred dihydroxy-functional compounds are mixtures of various large dihydroxy-functional molecules. The dihydroxy-functional compounds are preferably polyether diols, polyester diols or dimer diols.

It is preferable in the context of the present invention that the dimer fatty acids and the aliphatic, araliphatic and/or aromatic, preferably aliphatic, dihydroxy-functional compounds are reacted with one another in a molar ratio of 0.7/2.3 to 1.6/1.7, preferably of 0.8/2.2 to 1.6/1.8 and most preferably of 0.9/2.1 to 1.5/1.8. As a result of the excess of hydroxyl groups, hydroxy-functional reaction products additionally having a low acid number are thus obtained. Through the level of the excess, it is possible to control the molecular weight of the reaction product. If only a small excess of the hydroxy-functional reactant is used, the result is correspondingly longer-chain products, since only in that case is a substantial conversion of the acid groups present guaranteed. In the case of a higher excess of the hydroxy-functional reactant, the result is correspondingly shorter-chain reaction products. The number-average molecular weight of the reaction products is of course also influenced by the molecular weight of the reactants, for example the preferably aliphatic dihydroxy-functional compounds. The number-average molecular weight of the preferred reaction products may vary widely and is, for example, from 600 to 40 000 g/mol, especially from 800 to 10 000 g/mol, most preferably from 1200 to 5000 g/mol.

The preferred reaction products can thus also be described as linear block-type compounds A-(B-A)$_n$. In that case, at least one type of blocks is based on a compound (v). Preferably, the B blocks are based on dimer fatty acids, i.e. compounds (v). The A blocks are preferably based on aliphatic dihydroxy-functional compounds, especially preferably on aliphatic polyether diols, polyester diols or dimer diols. In the latter case, the respective reaction product is thus based exclusively on compounds (v) joined to one another.

Very particularly preferred reaction products (R) are preparable by reaction of dimer fatty acids with at least one aliphatic dihydroxy-functional compound of the general structural formula (I):

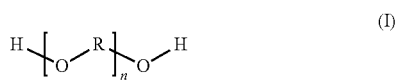

(I)

where R is a $C_3$ to $C_6$ alkylene radical and n is correspondingly selected such that the compound of the formula (I) has a number-average molecular weight of 120 to 6000 g/mol, the dimer fatty acids and the compounds of the formula (I) are used in a molar ratio of 0.7/2.3 to 1.6/1.7, and the resulting reaction product has a number-average molecular weight of 600 to 40 000 g/mol and an acid number of less than 10 mg KOH/g.

In a very particularly preferred embodiment, n is thus selected here such that the compound of the formula (I) has a number-average molecular weight of 450 to 2200 g/mol, especially 800 to 1200 g/mol. R is preferably a $C_3$ or $C_4$ alkylene radical. It is more preferably an isopropylene radical or a tetramethylene radical. Most preferably, the compound of the formula (I) is polypropylene glycol or polytetrahydrofuran. The dimer fatty acids and the compounds of the formula (I) are used here preferably in a molar ratio of 0.7/2.3 to 1.3/1.7. In this embodiment, the resulting reaction product has a number-average molecular weight of 1500 to 5000 g/mol, preferably 2000 to 4500 g/mol and most preferably 2500 to 4000 g/mol.

Likewise very particularly preferred reaction products (R) are preparable by reaction of dimer fatty acids with at least one dihydroxy-functional compound of the general structural formula (II):

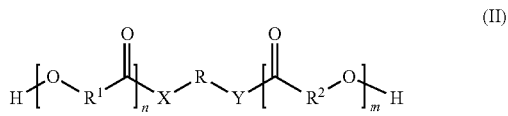

(II)

where
R is a divalent organic radical comprising 2 to 10 carbon atoms,
$R^1$ and $R^2$ are each independently straight-chain or branched alkylene radicals having 2 to 10 carbon atoms,
X and Y are each independently O, S or $NR^3$ in which $R^3$ is hydrogen or an alkyl radical having 1 to 6 carbon atoms, and m and n are correspondingly selected such that the compound of formula (II) has a number-average molecular weight of 450 to 2200 g/mol,
in which components (a) and (b) are used in a molar ratio of 0.7/2.3 to 1.6/1.7 and the resulting reaction product has a number-average molecular weight of 1200 to 5000 g/mol and an acid number of less than 10 mg KOH/g.

In structural formula (II), R is a divalent organic radical comprising 2 to 10 carbon atoms and preferably 2 to 6 carbon atoms. The R radical may, for example, be aliphatic, aromatic or aralipathic. The R radical, as well as carbon atoms and hydrogen atoms, may also contain heteroatoms, for example O or N. The radical may be saturated or unsaturated. R is preferably an aliphatic radical having 2 to 10 carbon atoms, more preferably an aliphatic radical having 2 to 6 carbon atoms and most preferably an aliphatic radical having 2 to 4 carbon atoms. For example, the R radical is $C_2H_4$, $C_3H_6$, $C_4H_8$ or $C_2H_4$—O—$C_2H_4$.

$R^1$ and $R^2$ are each independently straight-chain or branched alkylene radicals having 2 to 10 carbon atoms, preferably 2 to 6 carbon atoms and more preferably 3 to 5 carbon atoms. These radicals preferably contain only carbon and hydrogen.

In the compounds of the structural formula (II), all n $R^1$ radicals and all m $R^2$ radicals may be identical. However, it is also possible that different kinds of $R^1$ and $R^2$ radicals are present. Preferably, all $R^1$ and $R^2$ radicals are identical.

With very particular preference, $R^1$ and $R^2$ are a $C_4$ or $C_5$ alkylene radical, especially a tetramethylene or pentamethylene radical. In a very particularly preferred embodiment of the present invention, both radicals, $R^1$ and $R^2$, are pentamethylene radicals.

X and Y are each independently O, S or $NR^3$ in which $R^3$ is hydrogen or an alkyl radical having 1 to 6 carbon atoms. Preferably, X and Y are each independently O or $NR^3$; more preferably, they are each independently O and NH; most preferably, X and Y are O.

The indices m and n are accordingly selected such that the compounds of the structural formula (II) have a number-average molecular weight of 450 to 2200 g/mol, preferably 500 to 1400 g/mol, more preferably 500 to 1200 g/mol.

The polyester polyols of the general structural formula (I) can be prepared by a first route, where compounds HX—R—YH act as starter compounds and the hydroxy-terminated polyester chains are polymerized onto the starter compound by ring-opening polymerization of lactones of the hydroxycarboxylic acids HO—$R^1$—COOH and HO—$R^2$—COOH. By a second route, it is of course also possible first to prepare alpha-hydroxy-gamma-carboxy-terminated polyesters, for example by ring-opening polymerization of lactones of the hydroxycarboxylic acids HO—$R^1$—COOH and HO—$R^2$—COOH, or by polycondensation of the hydroxycarboxylic acids HO—$R^1$—COOH and HO—$R^2$—COOH. The alpha-hydroxy-gamma-carboxy-terminated polyesters can then be reacted in turn with compounds HX—R—YH, by means of a condensation reaction, to give the polyester diols for use in accordance with the invention.

Corresponding processes are described, for example, in German Offenlegungschrift 2234265 "Hydroxylendständige Polylactone" [Hydroxyl-terminal polylactones] from the applicant Stamicarbon N.V.

The dimer fatty acids and the compounds of the formula (II) are used here preferably in a molar ratio of 0.7/2.3 to 1.3/1.7. In this embodiment, the resulting reaction product has a number-average molecular weight of 1200 to 5000 g/mol, preferably 1200 to 4500 g/mol and most preferably 1200 to 4000 g/mol.

Likewise very particularly preferred reaction products (R) are preparable by reaction of dimer fatty acids with dimer diols, in which the dimer fatty acids and dimer diols are used in a molar ratio of 0.7/2.3 to 1.6/1.7 and the resulting reaction product has a number-average molecular weight of 1200 to 5000 g/mol and an acid number of less than 10 mg KOH/g.

Preferred dimer diols have already been described above. It is preferable here that the dimer fatty acids and dimer diols are used in a molar ratio of 0.7/2.3 to 1.3/1.7.

The resulting reaction product here preferably has a number-average molecular weight of 1200 to 5000 g/mol, preferably 1300 to 4500 g/mol, and very preferably 1500 to 4000 g/mol.

It follows from the above statements that the reaction products (R) are preparable by the exclusive use of compounds (v). For example, it is possible to prepare the reaction products by the use of the above-described preferred dimer fatty acids and dimer diols. Both compound classes are compounds (v), or both compound classes are mixtures comprising difunctional compounds (v). However, it is equally possible to prepare reaction products (R) by the reaction of compounds (v), preferably dimer fatty acids, with other organic compounds, especially those of the structural formulae (I) and (II).

In the context of the present invention, it is preferable that 25 to 100 mol % of at least one compound (v) are used in the preparation of the reaction products. If exclusively compounds (v) are used, it is evident that at least two compounds (v) are used.

The proportion of the reaction products (R) is preferably in the range from 0.1 to 15% by weight, preferably 0.5 to 12% by weight, more preferably 0.75 to 8% by weight, based in each case on the total weight of the aqueous coating composition of the invention.

If the content of the reaction products (R) is below 0.1% by weight, it may be the case that no further improvement is achieved in the impact resistance. If the content is more than 15% by weight, disadvantages may occur under some circumstances, for example incompatibility of said reaction product in the aqueous coating composition. Such incompatibility may be manifested, for example, in uneven leveling and also in floating or settling.

The reaction product for use in accordance with the invention is generally sparingly soluble in aqueous systems. It is therefore preferably used directly in the production of the aqueous coating composition, and is not added to the otherwise finished coating composition only on completion of production.

The coating compositions of the invention preferably comprise pigments, i.e. color pigments and/or effect pigments. Such color pigments and effect pigments are known to those skilled in the art and are described, for example, in Römpp-Lexikon Lacke und Druckfarben, Georg Thieme Verlag, Stuttgart, N.Y., 1998, pages 176 and 451. The terms "coloring pigment" and "color pigment" are interchangeable, just like the terms "visual effect pigment" and "effect pigment".

Preferred effect pigments are, for example, platelet-shaped metal effect pigments such as lamellar aluminum pigments, gold bronzes, oxidized bronzes and/or iron oxide-aluminum pigments, pearlescent pigments such as pearl essence, basic lead carbonate, bismuth oxide chloride and/or metal oxide-mica pigments and/or other effect pigments such as lamellar graphite, lamellar iron oxide, multilayer effect pigments composed of PVD films and/or liquid crystal polymer pigments. Particular preference is given to platelet-shaped metal effect pigments, especially lamellar aluminum pigments.

Typical color pigments especially include inorganic coloring pigments such as white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

The proportion of the pigments may, for example, be within the range from 1 to 30% by weight, preferably 1.5 to 20% by weight, more preferably 2.0 to 15% by weight, based on the total weight of the coating composition of the invention.

The coating compositions of the invention comprise, through the use of components (CP) and (R), curable binders, especially physically and thermally curable binders. A "binder" in the context of the present invention and in accordance with relevant DIN EN ISO 4618 is the nonvolatile component of a coating composition, without pigments and fillers. Specific binders are accordingly, for example, also standard coatings additives, the copolymer (CP) and the reaction product (R) or further polymers usable as described below, and typical crosslinking agents as described below. However, the expression is used hereinafter, merely for the sake of better clarity, principally in relation to particular physically and thermally curable polymers, for example particular polyurethanes, polyesters, polyacrylates and/or copolymers of the polymers mentioned.

In the context of the present invention, the term "physical curing" means the formation of a film through loss of solvent from polymer solutions or polymer dispersions. Typically, no crosslinking agents are necessary for this curing.

In the context of the present invention, the term "thermal curing" means the heat-initiated crosslinking of a coating film, with either a separate crosslinking agent or else self-crosslinking binders being employed in the parent coating material. The crosslinking agent contains reactive functional groups which are complementary to the reactive functional groups present in the binders. This is commonly referred to by those in the art as external crosslinking. Where the complementary reactive functional groups or autoreactive functional groups—i.e. groups which react with groups of the same kind—are already present in the binder molecules, the binders present are self-crosslinking. Examples of suitable complementary reactive functional groups and autoreactive functional groups are known from German patent application DE 199 30 665 A1, page 7 line 28 to page 9 line 24.

The coating composition of the invention preferably also comprises at least one polymer other than the copolymers (CP) and the reaction products (R) as a binder, especially at least one polymer selected from the group consisting of polyurethanes, polyesters, polyacrylates and/or copolymers of the polymers mentioned, especially polyurethane polyacrylates. Preferred polyurethanes are the polyurethanes already mentioned above in the description of step (i) of the preparation of the copolymers (CP). Preferred polyesters are described, for example, in DE 4009858 A1 in column 6 line 53 to column 7 line 61, and column 10 line 24 to column 13 line 3. Preferred polyurethane-polyacrylate copolymers (acrylated polyurethanes) other than the copolymers (CP) and the preparation thereof are described, for example, in WO 91/15528 A1, page 3 line 21 to page 20 line 33, and in DE 4437535 A1, page 2 line 27 to page 6 line 22. The polymers described as binders are preferably hydroxy-functional. Preferably, the coating compositions of the invention comprise, as well as the at least one copolymer (CP) and the at least one reaction product (R), at least one polyurethane-polyacrylate copolymer other than the copolymers (CP).

The proportion of the further polymers as a binder, preferably the at least one polyurethane-polyacrylate copolymer other than the copolymers (CP), is preferably in the range from 0.5 to 20.0% by weight, more preferably 1.0 to 15.0% by weight, especially preferably 1.5 to 10.0% by weight, based in each case on the total weight of the coating composition of the invention.

In addition, the coating composition of the invention preferably comprises at least one typical crosslinking agent known per se. It preferably comprises, as a crosslinking agent, at least one aminoplast resin and/or a blocked polyisocyanate, preferably an aminoplast resin. Among the aminoplast resins, melamine resins in particular are preferred.

The proportion of the crosslinking agents, especially aminoplast resins and/or blocked polyisocyanates, more preferably aminoplast resins, among these preferably melamine resins, is preferably in the range from 0.5 to 20.0% by weight, more preferably 1.0 to 15.0% by weight, especially preferably 1.5 to 10.0% by weight, based in each case on the total weight of the coating composition of the invention.

It follows from the above that the coating composition of the invention is preferably thermally curable and externally crosslinking. This is because it is possible to achieve appropriate external crosslinking through the use of hydroxy-functional reaction products (R), preferably hydroxy-functional polyurethane-polyacrylate copolymers other than the copolymers (CP), and also crosslinking agents, especially melamine resins. The statement that a coating composition is self-crosslinking and/or externally crosslinking in the context of the present invention should be understood to mean that this coating composition comprises polymers as binders and optionally crosslinking agents, which can correspondingly crosslink with one another. The underlying mechanisms and usable binders and crosslinking agents have been described above.

Preferably, the coating composition of the invention additionally comprises at least one thickener. Suitable thickeners are inorganic thickeners from the group of the sheet silicates. Lithium-aluminum-magnesium silicates are particularly suitable. As well as the inorganic thickeners, however, it is also possible to use one or more organic thickeners. These are preferably selected from the group consisting of (meth)acrylic acid-(meth)acrylate copolymer thickeners, for example the commercial product Rheovis AS S130 (BASF), and of polyurethane thickeners, for example the commercial product Rheovis PU 1250 (BASF). The thickeners used are different than the above-described polymers, for example the preferred binders. Preference is given to inorganic thickeners from the group of the sheet silicates.

The proportion of the thickeners, especially inorganic thickeners from the group of the sheet silicates, is preferably in the range from 0.01 to 5.0% by weight, preferably 0.02 to 4% by weight, more preferably 0.05 to 3.0% by weight, based in each case on the total weight of the coating composition of the invention.

In addition, the coating composition of the invention may also comprise at least one additive. Examples of such additives are salts which can be broken down thermally without residue or substantially without residue, resins as binders that are curable physically, thermally and/or with actinic radiation and are different than the polymers already mentioned, further crosslinking agents, organic solvents, reactive diluents, transparent pigments, fillers, dyes soluble in a molecular dispersion, nanoparticles, light stabilizers, antioxidants, deaerating agents, emulsifiers, slip additives, polymerization inhibitors, initiators of free-radical polymerizations, adhesion promoters, flow control agents, film-forming assistants, sag control agents (SCAs), flame retardants, corrosion inhibitors, waxes, siccatives, biocides, and matting agents.

Suitable additives of the aforementioned kind are known, for example, from

German patent application DE 199 48 004 A1, page 14 line 4 to page 17 line 5,

German patent DE 100 43 405 C1 column 5, paragraphs [0031] to [0033].

They are used in the customary and known amounts. For example, the proportion thereof may be in the range from 1.0 to 20.0% by weight, based on the total weight of the aqueous coating composition.

The solids content of the coating compositions of the invention may vary according to the requirements of the individual case. The solids content is guided primarily by the viscosity required for application, more particularly for spray application, and so may be adjusted by the skilled person on the basis of his or her general art knowledge, optionally with assistance from a few exploratory tests.

The solids content of the coating composition of the invention is preferably 5 to 70% by weight, more preferably 8 to 60% by weight and most preferably 12 to 55% by weight.

"Solids content" (nonvolatile content) is understood to mean that proportion by weight which remains as a residue on evaporation under fixed conditions. In the present application, the solids content is determined to DIN EN ISO 3251. This is done by evaporating the basecoat material at 130° C. for 60 minutes.

Unless stated otherwise, this test method is likewise employed in order, for example, to find out or predetermine the proportion of various components of the coating composition, for example of a copolymer (CP) or of a crosslinking agent, in the total weight of the coating composition. Thus, the solids content of a dispersion of a copolymer (CP) or of a crosslinking agent which is to be added to the coating composition is determined. By taking into account the solids content of the dispersion and the amount of the dispersion used in the coating composition, it is then possible to ascertain or find out the proportion of the component in the overall composition.

The coating composition of the invention is aqueous. The expression "aqueous" is known in this context to the skilled person. What is meant is basically a coating composition not based exclusively on organic solvents, i.e. not containing exclusively organic-based solvents, but instead containing, on the contrary, a significant proportion of water as solvent. "Aqueous" in the context of the present invention should preferably be understood to mean that the coating material in question has a proportion of at least 40% by weight, preferably at least 45% by weight, even more preferably at least 50% by weight, especially at least 60% by weight, of water, based in each case on the total amount of the solvents present (i.e. water and organic solvents). Preferably in turn, the proportion of water is 40 to 95% by weight, especially 45 to 90% by weight, even more preferably 50 to 90% by weight, more preferably 60 to 85% by weight, based in each case on the total amount of the solvents present.

The same definition of "aqueous" of course also applies to all further systems described in the context of the present invention, for example to the aqueous character of the aqueous dispersions of the copolymers (CP).

The coating compositions of the invention can be produced using the mixing assemblies and mixing techniques that are customary and known for the production of basecoat materials.

Preferably, the coating composition of the invention is a basecoat material, or the coating composition is preferably used as a basecoat material. This is especially true in the context of the process according the invention described hereinafter.

A basecoat material is an intermediate coating material that is used in automotive finishing and general industrial painting, generally one which imparts color and/or an effect. This basecoat material is generally applied to a metallic or plastics substrate which has been pretreated with surfacer or primer-surfacer, or else, occasionally, directly to the plastics substrate. Substrates used may also include existing paint systems, which may optionally require pretreatment as well (by abrading, for example). It has now become entirely customary to apply more than one basecoat film. Accordingly, in such a case, a first basecoat film constitutes the substrate for a second such film. To protect a basecoat film from environmental effects in particular, at least one additional clearcoat film is applied over it.

The Method of the Invention and the Multicoat Paint System of the Invention

The present invention likewise provides a method for producing multicoat paint systems, in which (1) an aqueous basecoat material is applied to a substrate,
(2) a polymer film is formed from the coating material applied in stage (1),
(3) a clearcoat material is applied to the resulting basecoat film, and then
(4) the basecoat film is cured together with the clearcoat film, which is characterized in that the aqueous basecoat material used in stage (1) is a coating material of the invention.

All of the above remarks regarding the coating composition of the invention also apply to the method of the invention. This is also true especially of all the preferred, more preferred and most preferred features. Especially preferably, the basecoat material comprises a pigment, i.e. has been pigmented.

Said method is preferably used to produce multicoat color paint systems, effect paint systems, and color and effect paint systems.

The aqueous basecoat material for use in accordance with the invention is commonly applied to metallic or plastics substrates that have been pretreated with surfacer or primer-surfacer. Said basecoat material may also be applied directly to the plastics substrate.

Where a metallic substrate is to be coated, it is preferably further coated with an electrocoat system before the surfacer or primer-surfacer is applied.

Where a plastics substrate is being coated, it is preferably also pretreated before the surfacer or primer-surfacer is applied. The techniques most frequently employed for such pretreatment are those of flaming, plasma treatment, and corona discharge. Flaming is used with preference.

The pigmented aqueous basecoat material of the invention may be applied to a metallic substrate, at the film thicknesses customary within the automobile industry, in the range, for example, of 5 to 100 micrometers, preferably 5 to 60 micrometers. This is done using spray application methods, for example compressed air spraying, airless spraying, high-speed rotation, electrostatic spray application (ESTA), alone or in conjunction with hot spray application, for example hot air spraying.

Following the application of the pigmented aqueous basecoat material, it can be dried by known methods. For example, (1-component) basecoat materials, which are preferred, can be flashed at room temperature for 1 to 60 minutes and subsequently dried, preferably at optionally slightly elevated temperatures of 30 to 90° C. Flashing and drying in the context of the present invention mean the evaporation of organic solvents and/or water, as a result of which the paint becomes drier but has not yet cured or not yet formed a fully crosslinked coating film.

Then a commercial clearcoat material is applied, by likewise common methods, the film thicknesses again being within the customary ranges, for example 5 to 100 micrometers. Preference is given to two-component clearcoat materials.

Following application of the clearcoat material, it may be flashed off at room temperature for 1 to 60 minutes, for example, and optionally dried. The clearcoat material is then cured together with the applied basecoat material. In the course of these procedures, crosslinking reactions occur, for example, to produce on a substrate a multiple-coat color and/or effect paint system of the invention. The curing is preferably effected by thermal means, at temperatures of 60 to 200° C.

All the film thicknesses stated in the context of the present invention should be understood as dry film thicknesses. The film thickness is thus that of the cured film in question. Thus, if it is stated that a coating material is applied in a particular film thickness, this should be understood to mean that the coating material is applied such that the stated film thickness results after the curing.

Plastics substrates are coated basically in the same way as metallic substrates. However, curing is effected here generally at much lower temperatures of 30 to 90° C., in order not to cause any damage to and/or deformation of the substrate.

The method of the invention can thus be used to paint metallic and nonmetallic substrates, more particularly plastics substrates, preferably automobile bodies or components thereof.

The method of the invention can be used further for dual finishing in OEM finishing. This means that a substrate which has been coated by means of the method of the invention is painted for a second time, likewise by means of the method of the invention.

The invention relates further to multicoat paint systems which are producible by the method described above. These multicoat paint systems are to be referred to below as multicoat paint systems of the invention.

All the above remarks relating to the aqueous coating composition of the invention and the method of the invention also apply correspondingly to said multicoat paint system. This is also true especially of all the preferred, more preferred and most preferred features.

The multicoat paint systems of the invention are preferably multicoat color paint systems, effect paint systems, and color and effect paint systems.

A further aspect of the invention relates to the method of the invention, wherein said substrate from stage (1) is a multicoat paint system having defects. This substrate/multicoat paint system having defects is thus an original finish, which is to be repaired ("spot repair") or completely recoated ("dual coating").

The method of the invention is accordingly also suitable for repairing defects on multicoat paint systems. Film defects are generally faults on and in the coating, usually named according to their shape or their appearance. The skilled person is aware of a host of possible kinds of such film defects. They are described for example in Römpp-Lexikon Lacke and Druckfarben, Georg Thieme Verlag, Stuttgart, N.Y., 1998, page 235, "Film defects".

In addition, the present invention relates to the use of the aqueous coating composition for improving the impact resistance of multicoat paint systems, especially for improving the stone-chip resistance. Thus, if the aqueous coating compositions of the invention are used in the painting of metallic and plastic substrates, the use thereof leads particularly to an improvement in the impact resistance of the built-up paint system. This is especially true when the aqueous coating material of the invention is used as a basecoat material and the method of the invention is used to build up a multicoat paint system of the invention.

The impact resistance or stone-chip resistance of paint systems can be determined by methods known to those skilled in the art. For example, one option is the stone-chip test to DIN 55966-1. An evaluation of appropriately treated paint system surfaces in terms of the degree of damage and hence in terms of the quality of stone-chip resistance can be made in accordance with DIN EN ISO 20567-1.

The invention is illustrated below using examples.

Examples

Specification of Particular Components and Measurement Methods
Dimer Fatty Acid:
The dimer fatty acid used contains less than 1.5% by weight of trimeric molecules, 98% by weight of dimeric molecules, and less than 0.3% by weight of fatty acid (monomer). It is prepared on the basis of linolenic, linoleic, and oleic acids (Pripol™ 1012-LQ-(GD) (from Croda)).
Polyester 1 (P1):
Prepared as per example D, column 16 lines 37 to 59 of DE 4009858 A. The corresponding polyester solution has a solids content of 60% by weight, the solvent used being butyl glycol rather than butanol, so the solvents present are primarily butyl glycol and water.
Determination of the Number-Average Molecular Weight:
The number-average molecular weight was determined by means of vapor pressure osmosis. Measurement was effected using a vapor pressure osmometer (model 10.00 from Knauer) on concentration series of the component under investigation in toluene at 50° C., with benzophenone as calibration substance for determination of the experimental calibration constant of the measuring instrument employed (in accordance with E. Schröder, G. Müller, K.-F. Arndt, "Leitfaden der Polymercharakterisierung", Akademie-Verlag, Berlin, pp. 47-54, 1982, in which benzil was used as calibration substance).
Preparation of a Copolymer (CP) for Use in Accordance with the Invention
A copolymer (CP) or an aqueous dispersion comprising said polymer was prepared as follows:
a) A dispersion of an alpha-methylstyryl-containing polyurethane was prepared on the basis of the patent DE 19948004 B4, page 27, example 1, "Herstellung eines erfindungsgemäßen Polyurethans (B)" ["Preparation of a polyurethane (B) of the invention"], except with additional use of trimethylolpropane and with a solids content of the resulting dispersion of only 29% rather than 35.1% by weight. Based on the adduct (B2) mentioned in the patent DE 19948004 B4, preparation example 1, an adduct was prepared with monoethanolamine rather than with diethanolamine:

For this purpose, a reaction vessel equipped with stirrer, internal thermometer, reflux condenser and electrical heater was first initially charged, under nitrogen, with 200.0 parts by weight of methyl ethyl ketone, 800.0 parts by weight of N-methylpyrrolidone and 221.3 parts by weight of monoethanolamine (from BASF SE) at 20° C. To this mixture were added dropwise, over the course of one and a half hours, 778.7 parts by weight of 1-(1-isocyanato-1-methylethyl)-3-(1-methylethenyl)benzene (TMI® (META) Unsaturated Aliphatic Isocyanate, from Cytec) having an isocyanate content of 20.4% by weight of isocyanate, such that the reaction temperature did not exceed 40° C. The resulting reaction mixture was stirred until no free isocyanate groups were detectable any longer. Thereafter, the reaction mixture was stabilized with 200 ppm of hydroquinone.

The theoretical solids content of the solution of the described adduct prepared in this way was 50% by weight.

Then, in a further reaction vessel equipped with stirrer, internal thermometer, reflux condenser and electrical heater, 431.7 parts by weight of a linear polyester polyol and 69.7 parts by weight of dimethylolpropionic acid (from GEO Specialty Chemicals) were dissolved in 355.8 parts by weight of methyl ethyl ketone and 61.6 parts by weight of N-methylpyrrolidone under nitrogen. The linear polyester polyol had been prepared beforehand from dimerized fatty acid (Pripol® 1012, from Uniqema), isophthalic acid (from BP Chemicals) and hexane-1,6-diol (from BASF SE) (weight ratio of the starting materials:dimeric fatty acid to isophthalic acid to hexane-1,6-diol=54.00:30.02:15.98) and had a hydroxyl number of 73 mg KOH/g solids and a number-average molar mass of 1379 g/mol. Added to the resulting solution at 45° C. were 288.6 parts by weight of isophorone diisocyanate (Basonat® I, from BASF SE) having an isocyanate content of 37.75% by weight. After the exothermic reaction had abated, the reaction mixture was heated gradually to 80° C. while stirring. Stirring was continued at this temperature until the isocyanate content of the solution was constant at 3.2% by weight. Thereafter, the reaction mixture was cooled to 65° C., and 85.2 parts by weight of the above-described adduct were added together with 21.8 parts by weight of trimethylolpropane (from BASF SE). The resulting reaction mixture was stirred at 65° C. until the isocyanate content of the solution had fallen to 1.0% by weight. Now 22.2% by weight of the diethanolamine (from BASF SE) were added and the content of isocyanate groups was monitored until no free isocyanate groups were detectable any longer. The resulting dissolved polyurethane was admixed with 139.7 parts by weight of methoxypropanol and 43.3 parts by weight of triethylamine (from BASF SE). 30 minutes after the addition of amine, the temperature of the solution was lowered to 60° C., after which 1981 parts by weight of deionized water were added while stirring over the course of 30 minutes. The methyl ethyl ketone was distilled out of the resulting dispersion at 60° C. under reduced pressure. Thereafter, any losses of solvent and water were compensated for.

The dispersion of an alpha-methylstyryl-containing polyurethane thus obtained had a solids content of 29.0% by weight, the acid number was 34.0 mg KOH/g solids, and the pH was 7.0 (measured at 23° C.).
b) To prepare the aqueous primary dispersion of the copolymer (CP) of the invention, under a nitrogen atmosphere, 1961.2 parts by weight of the alpha-methylstyryl-containing polyurethane dispersion according to a) were diluted with 40.0 parts by weight of methoxypropanol (0.07% based on polyurethane) and 686.5 parts by weight of deionized water, and heated to 80° C. After the reactor contents had been heated to 80° C., 0.6 part by weight of ammonium peroxodisulfate, dissolved in 35.7 parts by weight of deionized water, were introduced into the reactor under standard pressure. Subsequently, with continued stirring, a mixture of 301.6 parts by weight of methyl methacrylate, 261.6 parts by weight of n-butyl acrylate, 5.6 parts by weight of allyl methacrylate (0.87 mol % based on total vinyl monomer) and 134.9 parts by weight of N-methylpyrrolidone was added homogeneously over the course of five hours. With commencement of the addition of the monomer mixture, a solution of 1.1 parts by weight of ammonium peroxodisulfate in 71.3 parts by weight of deionized water was likewise added within five hours.

During the free-radical polymerization, every 30 minutes, the content of free monomers was determined by means of gas chromatography (GC) (GC: once with 50 m silica capillary column with polyethylene glycol phase and once with 50 m silica capillary column with polydimethylsiloxane phase, carrier gas: helium, split injector 150° C., oven temperature 40-220° C., flame ionization detector, detector temperature 275° C., internal standard: isobutyl acrylate), and the highest total monomer content based on dispersion of 0.5% by weight was found after 30 min (3.1% by weight based on the total amount of olefinically unsaturated monomers used for polymerization).

After the simultaneous end of the metered addition of monomer and initiator, the resulting reaction mixture was stirred at 80° C. for a further hour and then cooled to room temperature.

The resulting primary dispersion of the copolymer had a very good storage stability. The solids content thereof was 32.5% by weight, the acid number was 18.8 mg KOH/g solids, and the pH thereof was 7.0. The particle size (z average) by means of photon correlation spectroscopy was 96 nm. By means of gas chromatography (GC: once with 50 m silica capillary column with polyethylene glycol phase and once with 50 m silica capillary column with polydimethylsiloxane phase, carrier gas: helium, split injector 250° C., oven temperature 40-220° C., flame ionization detector, detector temperature 275° C., internal standard: n-propyl glycol), a content of 2.7% by weight of methoxypropanol and 5.7% by weight of N-methylpyrrolidone was found.

After the extraction of the freeze-dried polymer by means of tetrahydrofuran, the gel content was found gravimetrically to be 80.3% by weight. For this purpose, the dispersion was freeze-dried and the mass of the freeze-dried polymer was determined, and then the polymer was extracted in an excess of tetrahydrofuran (ratio of tetrahydrofuran to freeze-dried copolymer=300:1) at 25° C. for 24 hours. The insoluble content (gel content) was isolated, dried at 50° C. in an air circulation oven for 4 hours, and then re-weighed.
Preparation of a Reaction Product (R) for Use in Accordance with the Invention In a 4 l stainless steel reactor equipped with anchor stirrer, thermometer, condenser, thermometer for overhead temperature measurement and water separator, 2000.0 g of linear diolic PolyTHF1000 (2 mol), 579.3 g of dimer fatty acid (1 mol) and 51 g of cyclohexane were heated to 100° C. in the presence of 2.1 g of di-n-butyltin oxide (Axion® CS 2455, from Chemtura). Heating was continued gently until the onset of the condensation. With a maximum overhead temperature of 85° C., heating was then continued in steps up to 220° C. The progress of the reaction was monitored via the determination of the acid number. When an acid number of ≤3 mg KOH/g was reached, cyclohexane still present was removed by vacuum distillation. A viscous resin was obtained.

Amount of condensate (water): 34.9 g
Acid number: 2.7 mg KOH/g
Solids content (60 min at 130° C.): 100.0%
Molecular weight (vapor pressure osmosis):
Mn: 2200 g/mol
Viscosity: 5549 mPas,
(measured at 23° C. using a rotational viscometer from Brookfield, model CAP 2000+, spindle 3, shear rate: 1333 $s^{-1}$)

Production of Aqueous Basecoat Materials
1. Production of a Comparative Waterborne Basecoat Material 1

The components listed under "aqueous phase" in table A were stirred together in the order stated to form an aqueous mixture. The combined mixture was then stirred for 10 minutes and adjusted, using deionized water and dimethylethanolamine, to a pH of 8 and to a spray viscosity of 58 mPas under a shearing load of 1000 $s^{-1}$ as measured with a rotary viscometer (Rheomat RM 180 instrument from Mettler-Toledo) at 23° C.

TABLE A

Waterborne basecoat material 1

| Component<br>Aqueous phase | Parts<br>by weight |
|---|---|
| 3% Na—Mg sheet silicate solution | 19.5 |
| Deionized water | 18.1 |
| Butyl glycol | 9 |
| Polyurethane-modified polyacrylate; prepared as per page 7 line 55 to page 8 line 23 of DE 4437535 A1 | 2.8 |
| 50% by weight solution of Rheovis ® PU 1250 (BASF); rheological agent | 0.4 |
| 3% by weight aqueous Rheovis ® AS S130 solution; rheological agent, available from BASF, in water | 3 |
| Polyester P1 | 2.5 |
| TMDD (BASF) | 1.7 |
| Melamine-formaldehyde resin (Luwipal 052 from BASF SE) | 3.8 |
| 10% dimethylethanolamine in water | 0.5 |
| Polyurethane-based graft copolymer; prepared analogously to DE 19948004-B4 (page 27 - example 2), solids content adjusted to 32.5% by weight with water | 16.5 |
| Isopar ® L from Exxon Mobil | 2 |
| Blue paste | 11.7 |
| Carbon black paste | 4 |
| Mica paste analogous to EP 1534792-B1, column 11 lines 1-17 (mica pigment was used instead of aluminum paste used therein) | 4.5 |

Production of the Blue Paste:
The blue paste was produced from 69.8 parts by weight of an acrylated polyurethane dispersion produced as per international patent application WO 91/15528, binder dispersion A, 12.5 parts by weight of Paliogen® Blue L 6482, 1.5 parts by weight of dimethylethanolamine (10% in demineralized water), 1.2 parts by weight of a commercial polyether (Pluriol® P900 from BASF SE) and 15 parts by weight of deionized water.
Production of the Carbon Black Paste:
The carbon black paste was produced from 25 parts by weight of an acrylated polyurethane dispersion produced as per international patent application WO 91/15528, binder dispersion A, 10 parts by weight of carbon black, 0.1 part by weight of methyl isobutyl ketone, 1.36 parts by weight of dimethylethanolamine (10% in demineralized water), 2 parts by weight of a commercial polyether (Pluriol P900 from BASF SE) and 61.45 parts by weight of deionized water.

1.1 Production of a Comparative Waterborne Basecoat Material 2

Waterborne basecoat material 2 was produced analogously to table A, except that the graft copolymer (CP) produced as described above was used in place of the polyurethane-based graft copolymer produced analogously to DE 19948004-B4 (page 27-example 2).

1.2 Production of a Waterborne Basecoat Material I1 of the Invention

Waterborne basecoat material I1 was produced analogously to waterborne basecoat material 2, except that the reaction product (R) produced as described above was used in place of the polyester P1. The different amounts of butyl glycol, caused by the different solids content of the dispersion containing P1 and the reaction product R obtained, were compensated for in the formulation I1 by appropriate addition of butyl glycol.

Comparison Between Waterborne Basecoat Materials 1, 2 and I1

To determine the stone-chip resistance or stone-chip stability resistance, multicoat paint systems were produced by the following general method:

A steel sheet coated with a commercial primer-surfacer of dimensions 10×20 cm served as the substrate. First of all, the particular basecoat material was applied pneumatically to said sheet in a film thickness of 10 to 15 micrometers. After the basecoat material had been flashed off at room temperature for one minute, the basecoat material was intermediately dried in an air circulation oven at 70° C. for 10 minutes. A customary two-component clearcoat material was applied pneumatically in a film thickness of 35 to 45 micrometers to the dried waterborne basecoat film. The resulting clearcoat film was flashed off at room temperature for 20 minutes. The waterborne basecoat film and the clearcoat film were then cured in an air circulation oven at 160° C. for 30 minutes.

The multicoat paint systems thus obtained were examined for stone-chip resistance. For this purpose, the stone-chip test was conducted to DIN 55966-1. The assessment of the results of the stone-chip test was conducted to DIN EN ISO 20567-1. Low values correspond to a good resistance. The results can be found in table 1.

TABLE 1

Stone-chip resistance for waterborne basecoat materials 1, 2 and I1

| WBM | Stone-chip result | Assessment |
| --- | --- | --- |
| 1 | 3.5 | not OK |
| 2 | 2.0 | not OK |
| I1 | 1.0 | OK |

The results confirm that the use of a coating composition of the invention as a basecoat material in the production of the multicoat paint systems distinctly increases the stone-chip resistance compared to the waterborne basecoat materials 1 and 2.

2. Production of a Comparative Waterborne Basecoat Material 3

The components listed under "aqueous phase" in table B were stirred together in the order stated to form an aqueous mixture. In the next step an organic mixture was prepared from the components listed under "organic phase". The organic mixture was added to the aqueous mixture. The combined mixture was then stirred for 10 minutes and adjusted, using deionized water and dimethylethanolamine, to a pH of 8 and to a spray viscosity of 58 mPas under a shearing load of 1000 $s^{-1}$ as measured with a rotary viscometer (Rheomat RM 180 instrument from Mettler-Toledo) at 23° C.

TABLE B

Waterborne basecoat material 3

| Component | Parts by weight |
| --- | --- |
| Aqueous phase | |
| 3% Na—Mg sheet silicate solution | 23 |
| Deionized water | 14.35 |
| Butyl glycol | 2.1 |
| Polyurethane-modified polyacrylate; prepared as per page 7 line 55 to page 8 line 23 of DE 4437535 A1 | 3.5 |
| 50% by weight solution of Rheovis ® PU 1250 (BASF); rheological agent | 0.25 |
| 3% by weight aqueous Rheovis ® AS S130 solution; rheological agent, available from BASF, in water | 3.5 |
| Polyester P1 | 3 |
| TMDD (BASF) | 2 |
| Melamine-formaldehyde resin (Luwipal 052 from BASF SE) | 6.6 |
| 10% dimethylethanolamine in water | 1.3 |
| Polyurethane-based graft polymer; prepared analogously to DE 19948004-B4 (page 27 - example 2), solids content adjusted to 32.5% by weight with water | 16.5 |
| Isopar L ® from Exxon Mobil | 2 |
| Pluriol ® P 900 from BASF SE | 0.9 |
| Blue paste | 0.6 |
| Organic phase | |
| Aluminum pigment, available from Altana-Eckart | 6.4 |
| Butyl glycol | 7.6 |
| Polyurethane-based graft polymer; prepared analogously to DE 19948004-B4 (page 27-example 2), solids content adjusted to 32.5% by weight with water | 6.4 |

Production of the Blue Paste:

The blue paste was produced from 69.8 parts by weight of an acrylated polyurethane dispersion produced as per international patent application WO 91/15528, binder dispersion A, 12.5 parts by weight of Paliogen® Blue L 6482, 1.5 parts by weight of dimethylethanolamine (10% in demineralized water). 1.2 parts by weight of a commercial polyether (Pluriol® P900 from BASF SE) and 15 parts by weight of deionized water.

2.1 Production of a Comparative Waterborne Basecoat Material 4

Waterborne basecoat material 4 was produced analogously to table B, except that the graft copolymer (CP) produced as described above was used in place of the polyurethane-based graft copolymer produced analogously to DE 19948004-B4 (page 27-example 2).

2.2 Production of a Waterborne Basecoat Material I2 of the Invention

Waterborne basecoat material I2 was produced analogously to waterborne basecoat material 4, except that the reaction product (R) produced as described above was used in place of the polyester P1. The different amounts of butyl glycol, caused by the different solids content of the dispersion containing P1 and the reaction product R obtained, were compensated for in the formulation I2 by appropriate addition of butyl glycol.

Comparison Between Waterborne Basecoat Materials 3, 4 and 12

Analogously to the above-described production and examination of multicoat paint systems comprising basecoats based on waterborne basecoat materials 1, 2 and 11, multicoat paint systems comprising basecoats comprising waterborne basecoat materials 3, 4 and 12 were produced and examined. The results can be found in table 2.

TABLE 2

Stone-chip resistance of waterborne basecoat materials 3, 4 and 12

| WBM | Stone-chip result | Assessment |
|---|---|---|
| 3 | 5 | not OK |
| 4 | 2.5 | not OK |
| 12 | 1.5 | OK |

The results confirm that the use of a coating composition of the invention as a basecoat material in the production of the multicoat paint systems distinctly increases the stone-chip resistance compared to the prior art waterborne basecoat materials, here waterborne basecoat materials 3 and 4.

The invention claimed is:

1. An aqueous coating composition, comprising:
   at least one aqueous dispersion comprising at least one copolymer (CP), said copolymer (CP) prepared by
   (i) initially charging an aqueous dispersion of at least one polyurethane, and then
   (ii) polymerizing a mixture of olefinically unsaturated monomers in the presence of the polyurethane from (i), in which
   (a) a water-soluble initiator is used,
   (b) the olefinically unsaturated monomers are metered in such that a concentration of 6.0% by weight, based on the total amount of olefinically unsaturated monomers used for polymerization, in the reaction solution is not exceeded over the entire reaction time, and
   (c) the mixture of the olefinically unsaturated monomers comprises at least one polyolefinically unsaturated monomer;
   and
   at least one linear hydroxy-functional reaction product (R) having an acid number less than 20 mg KOH/g, the preparation of which involves using at least one compound (v) containing two functional groups (v.a) and an aliphatic or araliphatic hydrocarbyl radical (v.b) which is arranged between the functional groups and has 12 to 70 carbon atoms,
   wherein the at least one copolymer (CP) has a core-shell structure comprising a core comprising the at least one polyurethane and a shell comprising at least one polymer of olefinically unsaturated monomers.

2. The coating composition as claimed in claim 1, wherein the mixture of olefinically unsaturated monomers used in step (ii) comprises 0.1 to 6.0 mol % of polyolefinically unsaturated monomers.

3. The coating composition as claimed in claim 1, wherein the mixture of olefinically unsaturated monomers used in step (ii) comprises allyl methacrylate, and no further polyolefinically unsaturated monomers are present.

4. The coating composition as claimed in claim 1, wherein the olefinically unsaturated monomers in step (ii) (b) are metered in such that a concentration of 4.0% by weight, based on the total amount of olefinically unsaturated monomers used for polymerization, in the reaction solution is not exceeded over the entire reaction time.

5. The coating composition as claimed in claim 1, wherein the functional groups (v.a) in the at least one compound (v) are selected from the group consisting of hydroxyl groups and carboxyl groups.

6. The coating composition as claimed in claim 1, wherein a dimeric fatty acid, a dimer diol, or both, are used as the compound (v) in the preparation of the reaction product (R).

7. The coating composition as claimed in claim 1, wherein the reaction product (R) is prepared by reacting a dimer fatty acid with an aliphatic, araliphatic and/or aromatic dihydroxy-functional compound having a number-average molecular weight of 120 to 6000 g/mol.

8. The coating composition as claimed in claim 7, wherein the aliphatic, araliphatic and/or aromatic dihydroxy-functional compound is at least one of a polyether diol, a, polyester diol and a dimer diol.

9. The coating composition as claimed in claim 1, wherein the at least one reaction product (R) is selected from the group consisting of
   a reaction product prepared by reacting a dimer fatty acid with at least one aliphatic dihydroxy-functional compound of the general structural formula (I):

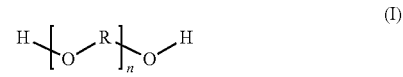

where R is a $C_3$ to $C_6$ alkylene radical and n is correspondingly selected such that the compound of the formula (I) has a number-average molecular weight of 120 to 6000 g/mol, the dimer fatty acids and the compounds of the formula (I) are used in a molar ratio of 0.7/2.3 to 1.6/1.7, and the resulting reaction product has a number-average molecular weight of 600 to 40 000 g/mol and an acid number of less than 10 mg KOH/g, a reaction product prepared by reacting a dimer fatty acid with at least one dihydroxy-functional compound of the general structural formula (II):

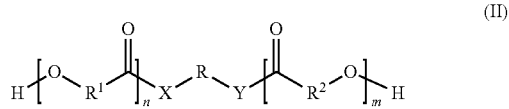

where
R is a divalent organic radical comprising 2 to 10 carbon atoms,
$R^1$ and $R^2$ are each independently straight-chain or branched alkylene radicals having 2 to 10 carbon atoms,
X and Y are each independently O, S or $NR^3$ in which $R^3$ is hydrogen or an alkyl radical having 1 to 6 carbon atoms, and
m and n are correspondingly selected such that the compound of formula (II) has a number-average molecular weight of 450 to 2200 g/mol,
in which components (a) and (b) are used in a molar ratio of 0.7/2.3 to 1.6/1.7 and the resulting reaction product has a number-average molecular weight of 1200 to 5000 g/mol and an acid number of less than 10 mg KOH/g, and a reaction product prepared by reacting a dimer fatty acid with a dimer diol, in which the dimer fatty acid and the dimer diol are used in a molar ratio of 0.7/2.3 to 1.6/1.7 and the resulting reaction product has a number-average molecular weight of 1200 to 5000 g/mol and an acid number of less than 10 mg KOH/g.

10. The coating composition as claimed in claim 1, wherein at least one hydroxy-functional polymer other than (CP) and (R) as a binder, selected from the group consisting of a polyurethane, a polyester, a polyacrylate and copolymers thereof is additionally present, as is a melamine resin as a crosslinking agent.

11. The coating composition as claimed in claim wherein at least one color pigment, effect pigment, or both, is additionally present.

12. The coating composition as claimed in claim 1, wherein the olefinically unsaturated monomers are metered in such that a concentration of 5.0% by weight, based on the total amount of olefinically unsaturated monomers used for polymerization, in the reaction solution is not exceeded over the entire reaction time.

13. The coating composition as claimed in claim 1, wherein the olefinically unsaturated monomers are metered in such that a concentration of 4.0% by weight, based on the total amount of olefinically unsaturated monomers used for polymerization, in the reaction solution is not exceeded over the entire reaction time.

14. The coating composition as claimed in claim 1, wherein the olefinically unsaturated monomers are metered in such that a concentration of 3.5% by weight, based on the total amount of olefinically unsaturated monomers used for polymerization, in the reaction solution is not exceeded over the entire reaction time.

15. The coating composition as claimed in claim 14, wherein the olefinically unsaturated monomers are metered in such that a concentration range of 0.05 to 3.5% by weight, based on the total amount of olefinically unsaturated monomers used for polymerization, in the reaction solution is used over the entire reaction time.

16. A method for producing multicoat paint systems, the comprising:
   (1) applying an aqueous basecoat material to a substrate,
   (2) forming a polymer film from the coating material applied in stage (1),
   (3) applying a clearcoat material to the resulting basecoat film, and then
   (4) curing the basecoat film together with the clearcoat film,
   wherein the aqueous basecoat material used in stage (1) is a coating composition as claimed in claim 1.

17. The method as claimed in claim 16, wherein the substrate used is a metallic substrate or a plastics substrate, said substrate being untreated or having been pretreated or precoated.

18. A multicoat paint system produced by a method as claimed in claim 16.

19. A method for improving the impact resistance of multicoat paint systems, the method comprising:
   applying the coating composition of claim 1 to a substrate; and then
   forming a polymer basecoat film from the coating composition, before applying at least one additional layer to the polymer basecoat film.

* * * * *

UNITED STATES PATENT AND TRADEMARK OFFICE
CERTIFICATE OF CORRECTION

| | | |
|---|---|---|
| PATENT NO. | : 10,344,181 B2 | |
| APPLICATION NO. | : 15/104912 | |
| DATED | : July 9, 2019 | |
| INVENTOR(S) | : Bernhard Steinmetz et al. | |

It is certified that error appears in the above-identified patent and that said Letters Patent is hereby corrected as shown below:

In the Specification

Column 3, Line 51, "G. Müller, K.-F. Amdt," should read --G. Müller, K.-F. Arndt,--;

Column 10, Lines 33 and 34, "Malvem Nano S90 (from Malvem Instruments)" should read --Malvern Nano S90 (from Malvern Instruments)--;

Column 16, Line 19, "Priopol® 2033" should read --Pripol® 2033--;

Column 29, Line 22, "Comparison between waterborne basecoat materials 1, 2 and 11" should read --Comparison between waterborne basecoat materials 1, 2 and I1--;

Column 30, Line 47, "(10% in demineralized water)." should read --(10% in demineralized water),--;

Column 31, Line 2, "Comparison between waterborne basecoat materials 3, 4 and 12" should read --Comparison between waterborne basecoat materials 3, 4 and I2--;

Column 31, Lines 5 and 6, "waterborne basecoat materials 1, 2 and 11," should read --waterborne basecoat materials 1, 2 and I1,--;

Column 31, Line 7, "waterborne basecoat materials 3, 4 and 12" should read --waterborne basecoat materials 3, 4 and I2--;

In the Claims

Column 32, Line 17, Claim 8, "polyether diol, a," should read --polyether diol a,--;

Column 33, Line 13, Claim 11, "as claimed in claim" should read --as claimed in claim 1,--.

Signed and Sealed this
Twelfth Day of May, 2020

Andrei Iancu
*Director of the United States Patent and Trademark Office*